(12) United States Patent
Hanley

(10) Patent No.: US 6,338,120 B1
(45) Date of Patent: Jan. 8, 2002

(54) APPARATUS FOR CACHE USE HISTORY ENCODING AND DECODING INCLUDING NEXT LRU AND NEXT MRU AND METHOD THEREFOR

(75) Inventor: Brian Patrick Hanley, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/259,177

(22) Filed: Feb. 26, 1999

(51) Int. Cl.[7] .............................................. G06F 12/00
(52) U.S. Cl. ........................ 711/136; 711/133; 711/160
(58) Field of Search ........................ 711/133–134, 136, 711/160

(56) References Cited

U.S. PATENT DOCUMENTS

| | | | |
|---|---|---|---|
| 4,059,850 A | 11/1977 | Van Eck et al. ............ 711/136 |
| 4,607,331 A | * 8/1986 | Goodrich, Jr. et al. ...... 711/136 |
| 4,967,414 A | 10/1990 | Lusch et al. .................. 714/45 |
| 5,060,136 A | 10/1991 | Furney et al. ............... 711/128 |
| 5,765,191 A | 6/1998 | Loper et al. ................ 711/136 |
| 5,809,528 A | * 9/1998 | Miller et al. ................ 711/136 |

* cited by examiner

Primary Examiner—Glenn Gossage
Assistant Examiner—Mehdi Namazi
(74) Attorney, Agent, or Firm—Barry S. Newberger; Winstead Sechrest & Minick P.C.; Anthony V. S. England (57) ABSTRACT

An apparatus for encoding/decoding an associative cache set use history, and method therefor, is implemented. A five-bit signal is used to fully encode a four-way cache. A least recently used (LRU) set is encoded using a first bit pair, and a second bit pair encodes a most recently used (MRU) set. The sets having intermediate usage are encoded by a remaining single bit. The single bit has a first predetermined value when the sets having intermediate usage have an in-order relationship in accordance with a predetermined ordering of the cache sets. The single bit has a second predetermined value when the sets having intermediate usage have an out-of-order relationship.

30 Claims, 8 Drawing Sheets

| Cache Set Usage 1 2 3 4 | Code XT | Y | ZV |
|---|---|---|---|
| A B C D | 00 | 1 | 11 |
| A B D C | 00 | 1 | 10 |
| A C B D | 00 | 0 | 11 |
| A C D B | 00 | 1 | 01 |
| A D B C | 00 | 0 | 10 |
| A D C B | 00 | 0 | 01 |
| B A C D | 01 | 1 | 11 |
| B A D C | 01 | 1 | 10 |
| B C A D | 01 | 0 | 11 |
| B C D A | 01 | 1 | 00 |
| B D A C | 01 | 0 | 10 |
| B D C A | 01 | 0 | 00 |
| C A B D | 10 | 1 | 11 |
| C A D B | 10 | 1 | 01 |
| C B A D | 10 | 0 | 11 |
| C B D A | 10 | 1 | 00 |
| C D A B | 10 | 0 | 10 |
| C D B A | 10 | 0 | 00 |
| D A B C | 11 | 1 | 10 |
| D A C B | 11 | 1 | 01 |
| D B A C | 11 | 0 | 10 |
| D B C A | 11 | 1 | 00 |
| D C A B | 11 | 0 | 01 |
| D C B A | 11 | 0 | 00 |

APPARATUS FOR CACHE USE HISTORY ENCODING AND DECODING INCLUDING NEXT LRU AND NEXT MRU AND METHOD THEREFOR

TECHNICAL FIELD

The present invention relates in general to data processing systems, and in particular, to cache set ordering according to the recency of use.

BACKGROUND INFORMATION

In order to reduce penalties in system performance due to accesses to and from relatively slow system memory, modem data processing systems employ memory caches constructed from high speed memory cells as an intermediate memory store between a central processing unit (CPU), and system memory. Data and instructions are loaded from system memory into cache and then fetched from cache by the CPU.

The CPU first looks to the cache for data and instructions. If the instructions or data required by the CPU are not in a cache, a so-called "cache miss" has occurred. Then, the CPU loads the data or instructions from memory into the cache. In order to provide space in the cache to store the incoming data or instructions, one or more cache lines needs to be moved from the cache, or "cast out," to system memory. To facilitate selection of a cache line for casting out, a history of use, that is, access to, each line in a predetermined class of lines may be encoded, and maintained in a history array. A cast out strategy may then use the history to select the lines to be cast out. If a class of cache line sets includes four sets, there are twenty-four possible permutations of accesses to the lines constituting the class. Typically, eight bits are used to encode the use history via a 32-to-5 encoder. Likewise, a 5-to-32 bit decoder is used to determine a set to be selected for the cast out.

Additionally, a prefetch strategy may be based on a most recently used (MRU) approach. Data paths in the cache memory allow only one set to be accessed at a time. However, a fast decode of the MRU set would permit the MRU set, in a level two (L2) cache to be speculatively brought into the level 1 (L1) cache in the same cycle as cache tags are read.

The history encoding and decoding operations represent an overhead in cache memory accesses. With increasing CPU speed, there is a need in the art for a reduction in the overhead represented by the implementation of a cache cast out strategy, as well as a speculative loads from an L2 cache to L1 cache. Thus, there is a need in the art, for apparatus and methods for faster encoding and decoding of cache set use histories.

SUMMARY OF THE INVENTION

The aforementioned needs are addressed by the present invention. Accordingly there is provided, in a first form, a method of encoding a use history in which a least recently used (LRU) set is encoded with a first preselected bit pair. The method also encodes a most recently used (MRU) set with a second preselected bit pair, and encodes a next least recently used (NLRU) set and a next most recently used (NMRU) set with a preselected single bit.

There is also provided, in a second form, a data processing system. The data processing system includes a cache memory including a plurality of cache line sets; and circuitry operable for generating a cache set use history encoding. Additionally, circuitry is coupled to the cache memory operable for decoding the encoding. The encoding comprises no more than five bits, the encoding being operable for recovering a complete use history.

Additionally, there is provided in a third form, a method of cache set history generation. The method includes the steps of decoding a next least recently used (NLRU) set and a next most recently used set (NMRU) in a previous use history in response to first and second bit pairs and a single bit encoding the previous history, and decoding a most recently used set in the previous history in response to the second bit pair encoding the previous history. The decoded sets are used to generate a current history by encoding a first bit pair in the current history in response to the previous NLRU, encoding a second bit pair in the current history in response to a cache hit and encoding a single bit in the current history in response to the NMRU and the MRU in the previous history.

There is additionally provided, in a fourth form, a data processing system containing a cache memory including a plurality of cache line sets, circuitry operable for generating a cache set use history encoding, and circuitry coupled to the cache memory operable for decoding the encoding. The decoding circuitry includes circuitry operable for forming first, second, third and fourth intermediate signals in response to first and second bit pairs in the encoding. Also included is circuitry operable for forming a first logical combination of the first and second intermediate signals and a single bit in the encoding, circuitry operable for forming a second logical combination of the first and second intermediate signals and the single bit, and circuitry operable for forming a third logical combination of the third and fourth intermediate signals. A first decoded history signal is formed by circuitry operable for decoding the first and third logical combinations and a second decoded history signal is formed by circuitry operable for decoding the second and third logical combinations.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

A mechanism for maintaining a use history for each set in a set associative cache is provided. A first pair of bits is used to encode a least recently used (LRU) cache line. A second pair of bits is used to encode a most recently used (MRU) cache line. A remaining pair of cache line sets, a next least recently used (NLRU), and a next most recently used (NMRU) cache line set are encoded using a single additional bit. In response to a cache access, the first and second bit pairs may be immediately decoded to determine the LRU cache line set and the MRU cache line set. The NLRU and NMRU are decoded using the remaining single bit, and intermediate data values determined from combinatoric operations on the first and second bit pairs encoding the LRU line and MRU line.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 1:
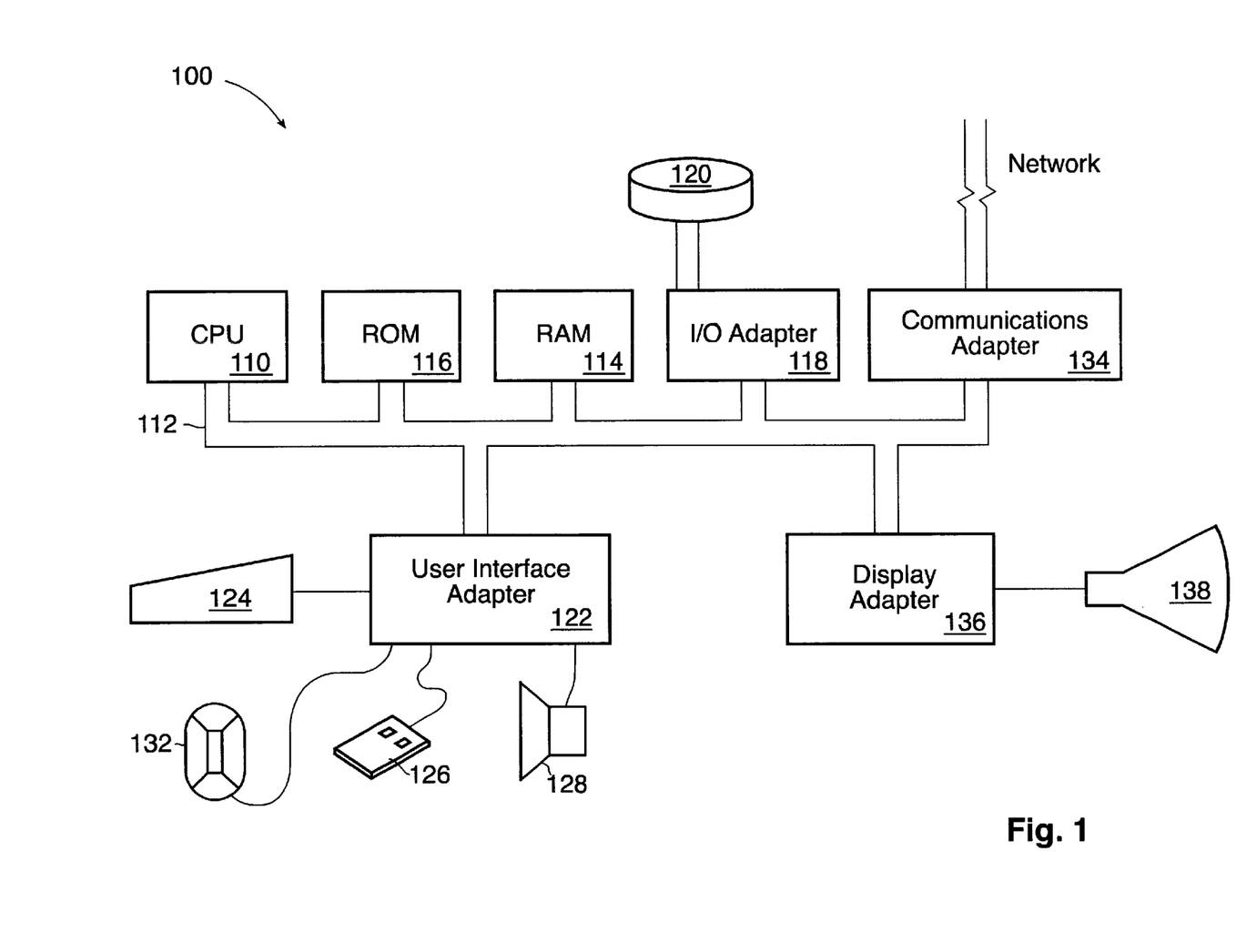
FIG. 1 illustrates, in block diagram form, a data processing system in accordance with one embodiment of the present invention.

A representative hardware environment for practicing the present invention is depicted in FIG. 1, which illustrates a typical hardware configuration of data processing system 100 in accordance with the subject invention having central processing unit (CPU) 110, such as a conventional microprocessor, and a number of other units interconnected via system bus 112. Data processing system 100 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, and/or other user interface devices such as a touch screen device (not shown) to bus 112, communication adapter 134 for connecting data processing system 100 to a data processing network, and display adapter 136 for connecting bus 112 to display device 138. CPU 110 may include other circuitry not shown herein, which will include circuitry commonly found within a microprocessor, e.g., execution unit, bus interface unit, arithmetic logic unit, etc. CPU 110 may also reside on a single integrated circuit.

Figure 2:
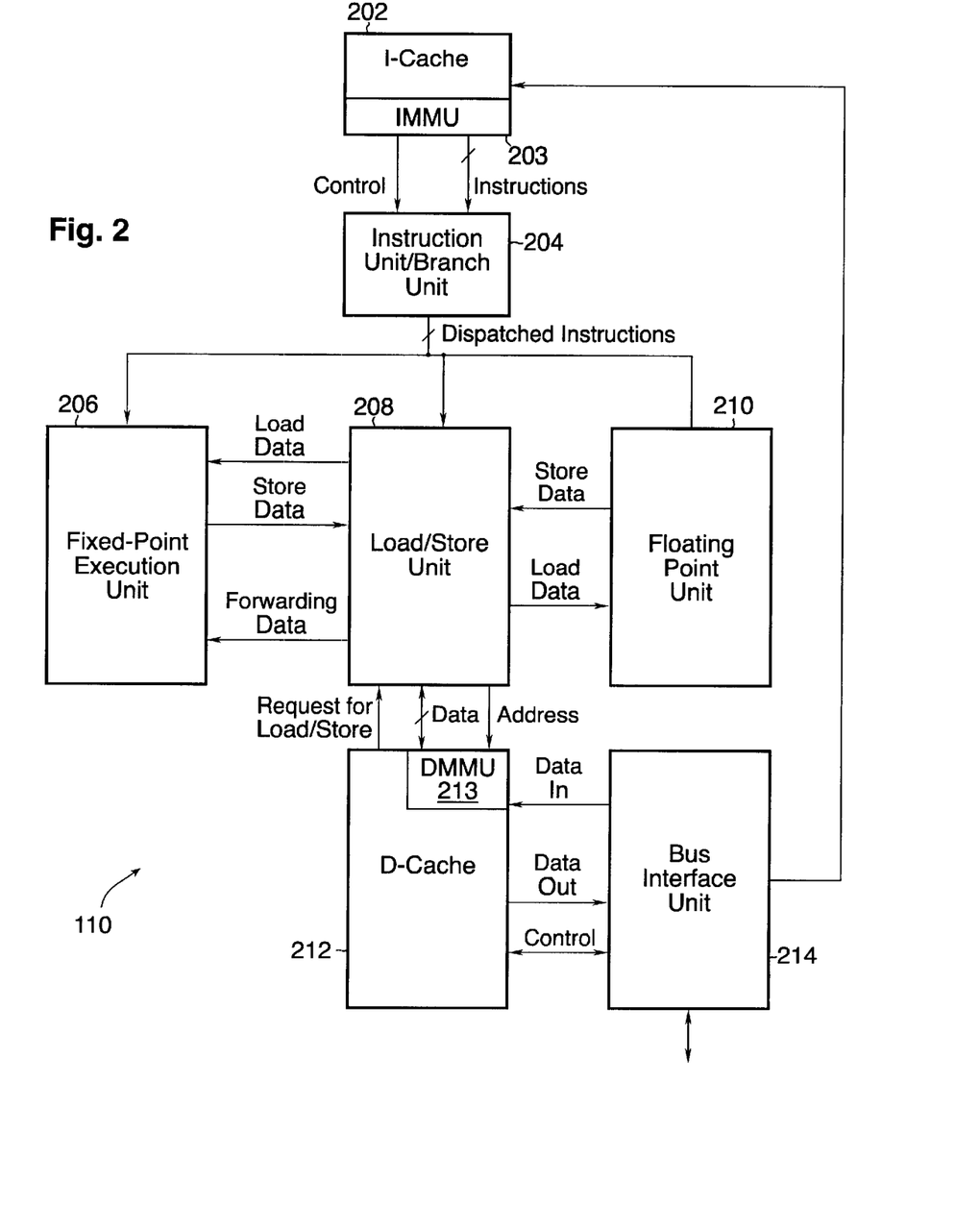
FIG. 2 illustrates, in block diagram form, a portion of a central processing unit in accordance with an embodiment of the present invention.

FIG. 2 illustrates a portion of CPU 110 in greater detail. The portion of CPU 110 comprises an instruction cache (I-cache) 202, an instruction unit/branch unit 204, a fixed point execution unit (FXU) 206, a load/store unit 208, a floating point unit (FPU) 210, a data cache (D-cache) 212, and a bus interface unit (BIU) 214.

I-cache 202 is coupled to instruction unit/branch unit 204 to communicate control information and a plurality of instructions. Fetch requests are mediated by instruction memory management unit (IMMU) 203. Instruction unit/ branch unit 204 is coupled to each of FXU 206, load/store unit 208, and FPU 210 to provide a plurality of dispatched instructions. I-cache 202 is coupled to bus interface unit 214 to communicate Data and Control information. FXU 206 is coupled to load/store unit 208 to communicate a load data value, a store data value, and a forwarding data value. Load/store unit 208 is coupled to FPU 210 to communicate a store data value and load data value. Load/store unit 208 is also coupled to D-cache 212 to communicate a request for a load/store signal, a plurality of data values, and an address value. D-cache 212 is coupled to bus interface unit 214 to communicate a data in signal, a data out signal, and a control signal. Data fetches are mediated by data memory management unit (DMMU) 213.

Figure 3:
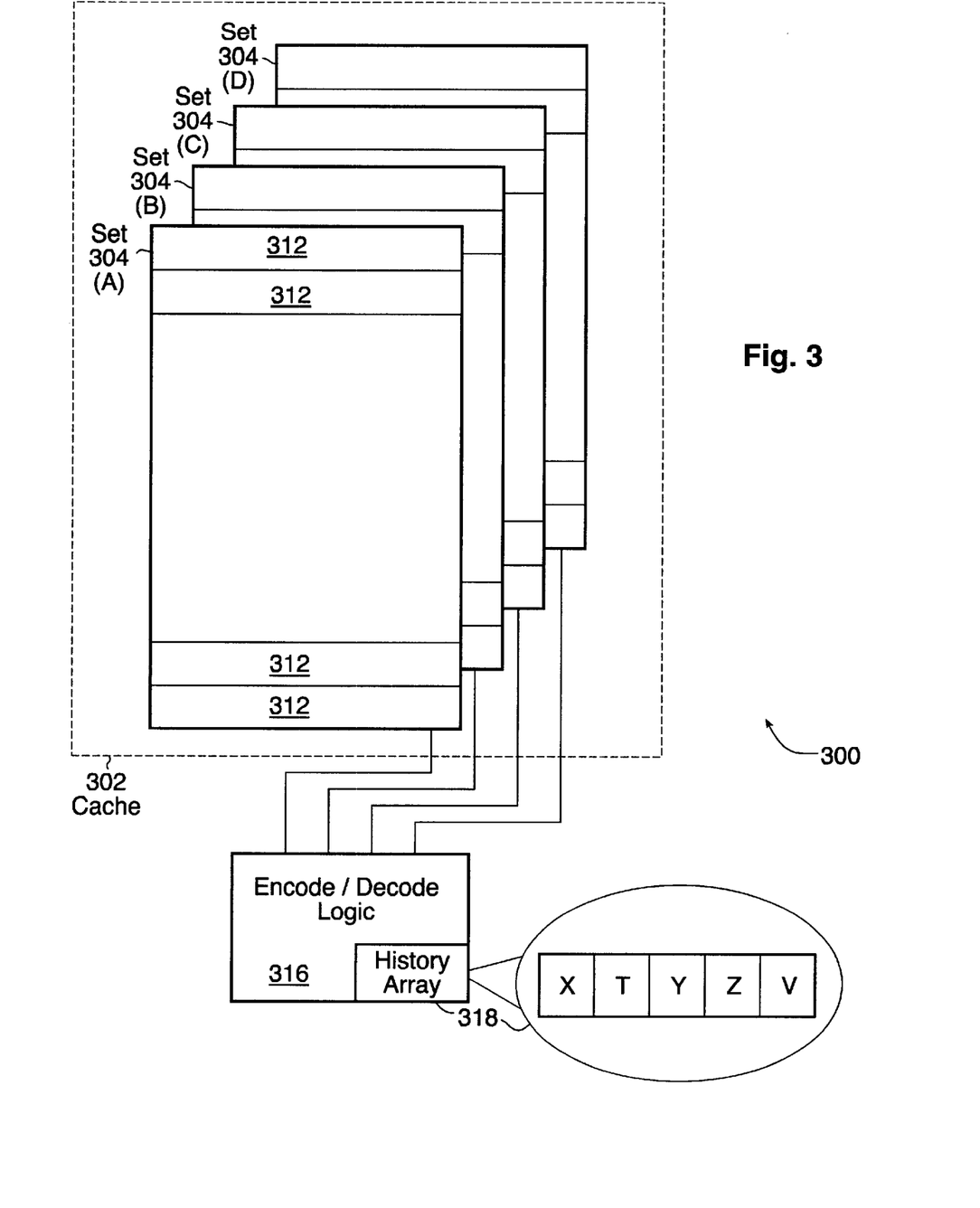
FIG. 3 illustrates, in block diagram form, a portion of a cache memory in accordance with an embodiment of the present invention.

Refer now to FIG. 3 illustrating a portion of a cache memory 300 in accordance with an embodiment of the present invention. Portion 300 may be a portion of an I-cache, such as, cache 202 in FIG. 2, or a D-cache, such as, cache 212 in FIG. 2. In another alternative embodiment, portion 300 may be a portion of a combined instruction and data cache, as would be understood by an artisan of ordinary skill in the relevant art. Portion 300 includes a four-way set associative cache 302. Cache 302 includes a plurality of sets 304, 306, 308, and 310. Each of sets 304–310 includes a plurality of cache lines 312 for the storage of data, instructions, or a combination of data and instructions depending on the implementation of an embodiment of cache 302 as an D-cache, I-cache, or a combined cache, respectively.

Portion 300 also includes encode/decode logic 316 coupled to sets 304–310. Encode/decode logic 316 may be part of a memory management unit, such as, IMMU 203 and DMMU 213 in FIG. 2. Encode/decode logic 316 encodes a five-bit use history which is maintained in history array 318. The five-bits are labeled X, T, Y, Z, and V. The labeling is strictly for convenience in referencing the bits, and is otherwise arbitrary. Furthermore, it would be understood by an artisan of ordinary skill that the ordering of the bits is immaterial and any predetermined permutation would be within the spirit and scope of the present invention.

Figure 4:
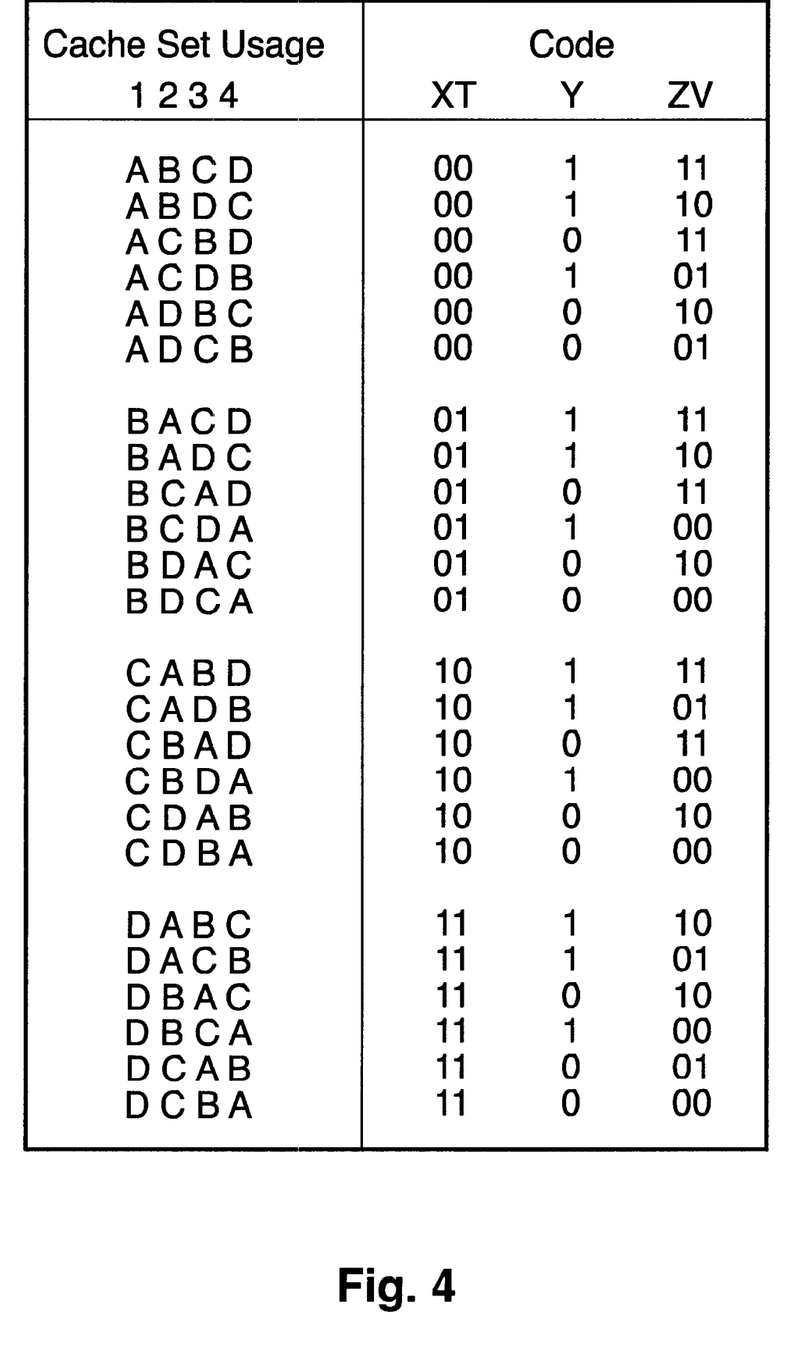
FIG. 4 illustrates a coding table in accordance with an embodiment of the present invention.

History encoding in accordance with the present invention is illustrated in the table in FIG. 4. In FIG. 4, use histories are labeled from the LRU set (1) to the MRU set (4). Sets with intermediate usage, the NLRU (2), and NMRU (3), are also labeled. Cache line sets are labeled A, B, C, and D, which labels order a class of the sets A–D. The twenty-four possible histories of sets A, B, C, and D, are shown, with the respective encodings of bits X, T, Y, Z and V.

Figure 5:
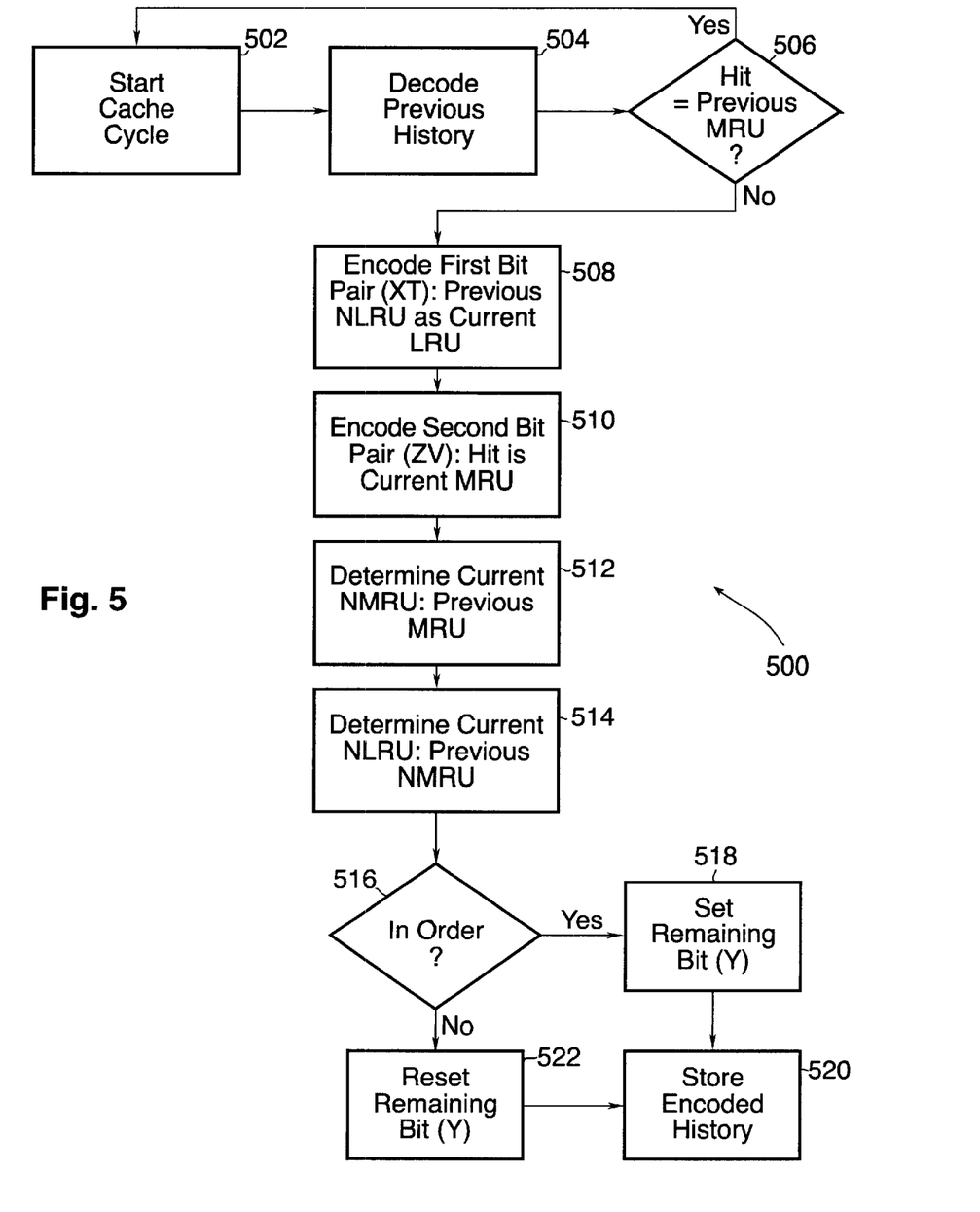
FIG. 5 illustrates, in flow chart form, a decoding methodology in accordance with an embodiment of the present invention.

FIG. 5 illustrates, in flow chart form, a methodology 500 for generating a use history, according to the present invention. A cache cycle starts in step 502, and in step 504, a previous history is decoded. Decoding of a cache set use history will be discussed in conjunction with FIG. 6. In step 506, it is determined if the cache hit is the previous MRU set, determined in the decoding step 504. If so, the history is unchanged, and methodology 500 returns to step 502.

If, however, in step 506, the cache line hit is in a different set than the previous MRU, in step 508, the first bit pair (XT) encodes the previous NLRU set as the current LRU. Referring to FIG. 4, the first bit pair uniquely encodes the LRU set. Thus, the first bit pair having the values "00" encodes set A as the LRU, the value "01" encodes set B as the LRU, etc.

In step 510, the current MRU set is encoded. A second bit pair (ZV) uniquely encodes the MRU set. The current cache hit is encoded as the current MRU. Encoding the MRU set in this way may advantageously allow a speculative fetch from the cache, as discussed hereinabove. Because the MRU set is immediately decoded, as described below, the MRU set may be accessed without having to wait for the decoding of the complete use history, in contrast to prior art methodologies, such as that of commonly-owned U.S. Pat. No. 5,765,141 to Loper et al. In an embodiment of the present invention, the MRU is encoded as indicated in FIG. 4.

In step 512, the current NMRU set is determined as the previous MRU obtained in decode step 504. Likewise, in step 514, the current NLRU set is determined as the previous NMRU set from step 504.

In step 516, it is determined if the current NLRU and current NMRU from steps 512, and 514 are in order, or have an "in-order" relationship. That is, the label (A, B, C, or D) corresponding to the NLRU precedes the label associated with the NMRU. For example, if the NLRU corresponds to set A and the NMRU corresponds to set C, the NLRU and NMRU are in order. Conversely, if the sets were reversed, the relationship would be "out of order." If, the NLRU and NMRU are in order, the remaining bit (Y) in the five-bit encoding is set, in step 518. The encoded history is then stored in step 520.

If, however, in step 516, the NLRU and the NMRU are out of order, bit Y is reset, in step 522, and the encoded history is stored, step 520.

Figure 6:
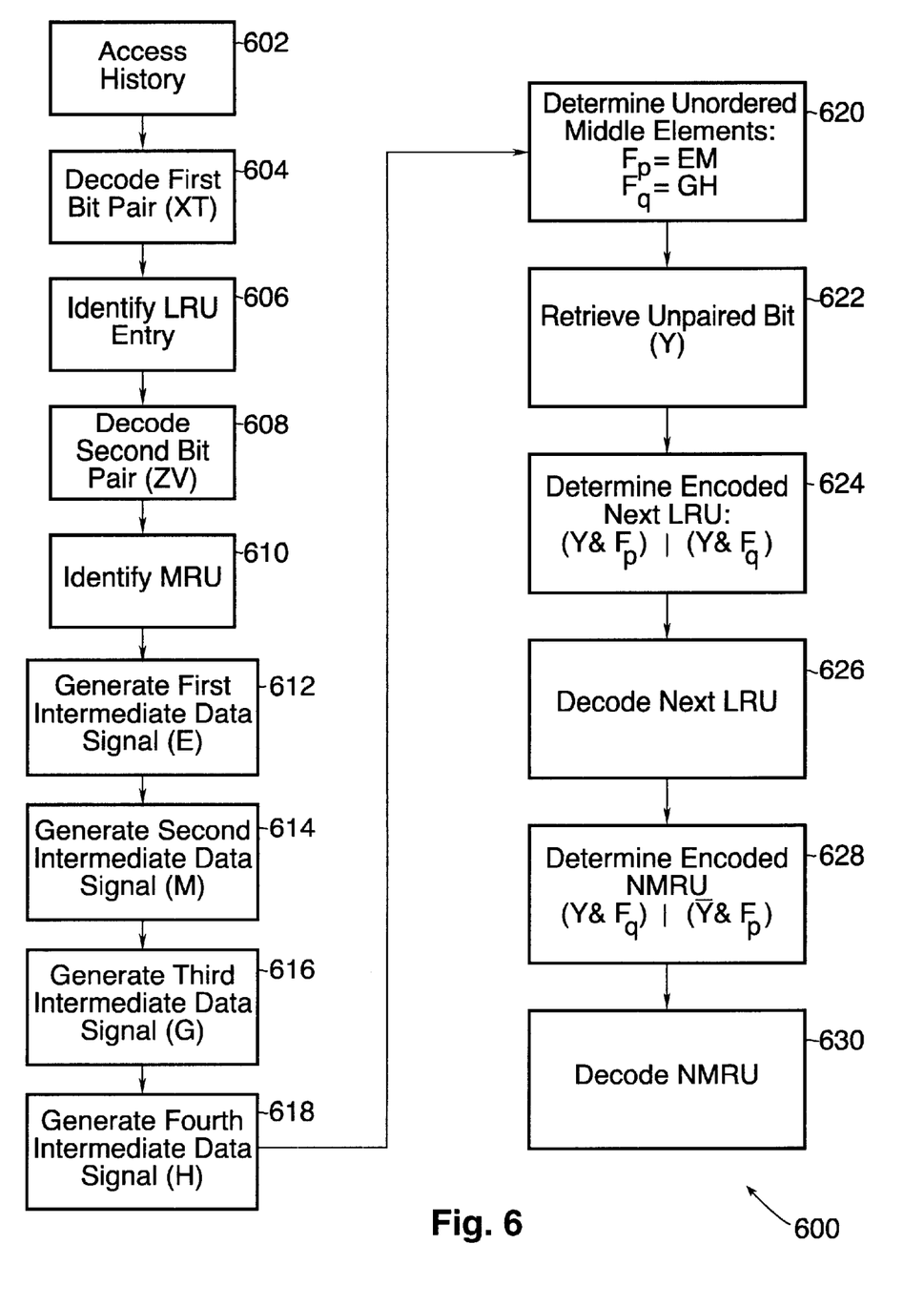
FIG. 6 illustrates, in flow chart form, an use history generation methodology in accordance with an embodiment of the present invention.

Refer now to FIG. 6 illustrating, in flow chart form, decode methodology 600. In step 602, the use history is accessed. In step 604, a first bit pair (XT) is decoded, and in step 606, the LRU set is identified. As previously described, the first bit pair uniquely encodes the LRU set. The first bit may be decoded using a two-to-four decoder, in accordance with circuitry known in the art.

In step 608, a second bit pair (ZV) is decoded. The second bit pair uniquely encodes the MRU set, in step 610, as described hereinabove. A two-to-four decoder may also be used to decode the second bit pair.

The NLRU and NMRU are coded in steps 612–630 of methodology 600. In step 612, a first intermediate data signal (E) is generated. A Karnaugh map for generating signal E is illustrated in Table 1:

TABLE 1

| ZV | XT | | | |
|---|---|---|---|---|
| | 00 | 01 | 11 | 10 |
| 00 | ** | 1 | 0 | 0 |
| 01 | 1 | ** | 0 | 0 |
| 11 | 0 | 0 | ** | 0 |
| 10 | 0 | 0 | 0 | ** |

Note that entries along the main diagonal in Table 1 (and in Tables 2–4 below) are impossible because each set has a unique encoding.

Figure 7:
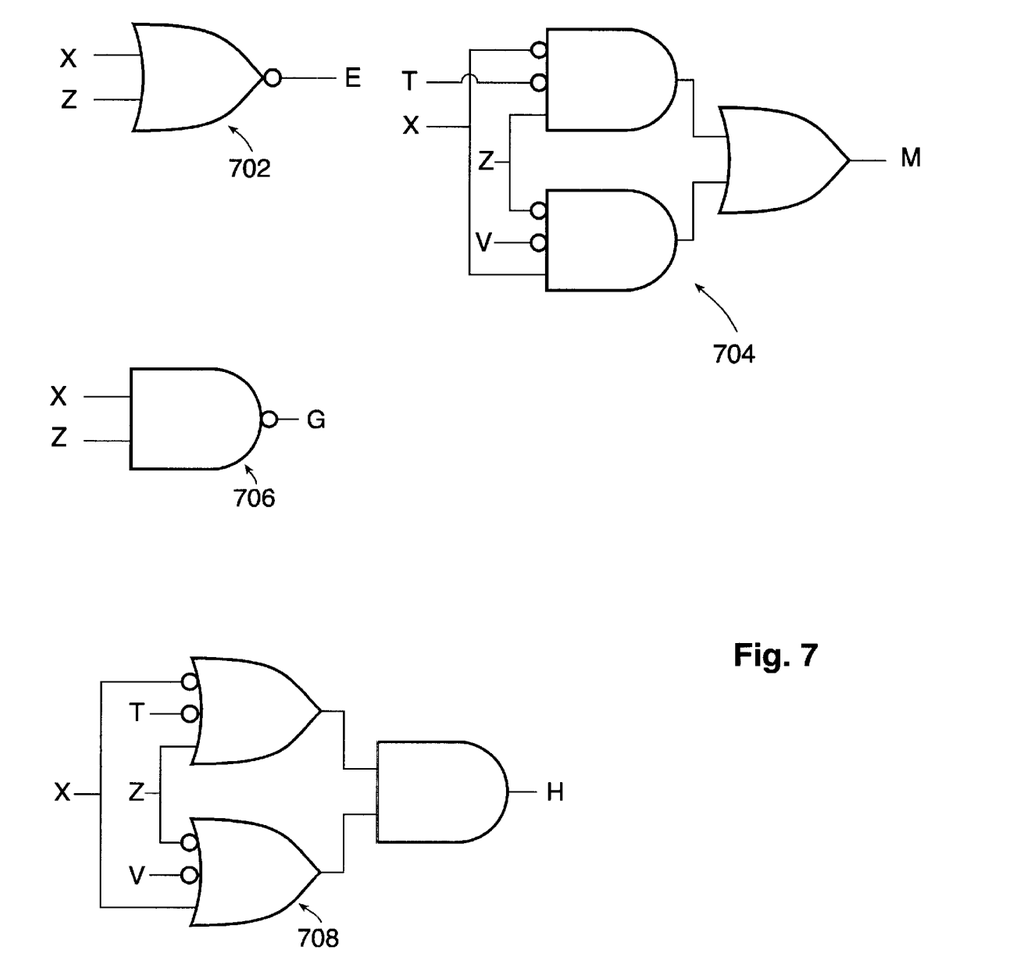
FIGS. 7 and 8 illustrates, in partial schematic form, decoder logic blocks in accordance with an embodiment of the present invention.

Signal E may be generated using logic block 702, in FIG. 7. A second intermediate data signal (M) is generated in step 614. The corresponding Karnaugh map is shown in Table 2:

TABLE 2

| ZV | XT | | | |
|---|---|---|---|---|
| | 00 | 01 | 11 | 10 |
| 00 | ** | 0 | 1 | 1 |
| 01 | 0 | ** | 0 | 0 |

TABLE 2-continued

| ZV | XT | | | |
|---|---|---|---|---|
| | 00 | 01 | 11 | 10 |
| 11 | 1 | 0 | ** | 0 |
| 10 | 1 | 0 | 0 | ** |

Referring to FIG. 7, logic block 704 may be used to generate signal M from bits X, Y, Z, V, and T, as shown. In step 616, a third intermediate data value (G) is generated. Data signal G may be generated in accordance the Karnaugh map illustrated in Table 3:

TABLE 3

| ZV | XT | | | |
|---|---|---|---|---|
| | 00 | 01 | 11 | 10 |
| 00 | ** | 1 | 1 | 1 |
| 01 | 1 | ** | 1 | 1 |
| 11 | 1 | 1 | ** | 0 |
| 10 | 1 | 1 | 0 | ** |

Logic block 706, FIG. 7, may be used to generate signal C. A fourth intermediate data signal (H) is generated in step 618. Signal H is generated in accordance with the Karnaugh map shown in Table 4:

TABLE 4

| ZV | XT | | | |
|---|---|---|---|---|
| | 00 | 01 | 11 | 10 |
| 00 | ** | 1 | 0 | 1 |
| 01 | 1 | ** | 0 | 1 |
| 11 | 0 | 0 | ** | 1 |
| 10 | 1 | 1 | 1 | ** |

Logic block 708, in FIG. 7, may be used to generate signal H from bits X, T, Y, Z, and V.

In step 620, the intermediate data signals E, M, G, and H are used to generate the encoded unordered NLRU and NMRU. These are determined in accordance with the following Boolean equations:

$$F_p = EM \quad (1)$$

$$F_q = GH \quad (2)$$

In step 622, the remaining unpaired bit in the five-bit encoded history, Y is obtained from the history accessed in step 602, and in step 624, the encoded NLRU is determined in accordance with Boolean Equation (3):

$$(Y \& F_p) | (\overline{Y} \& F_q) \quad (3)$$

Figure 8:
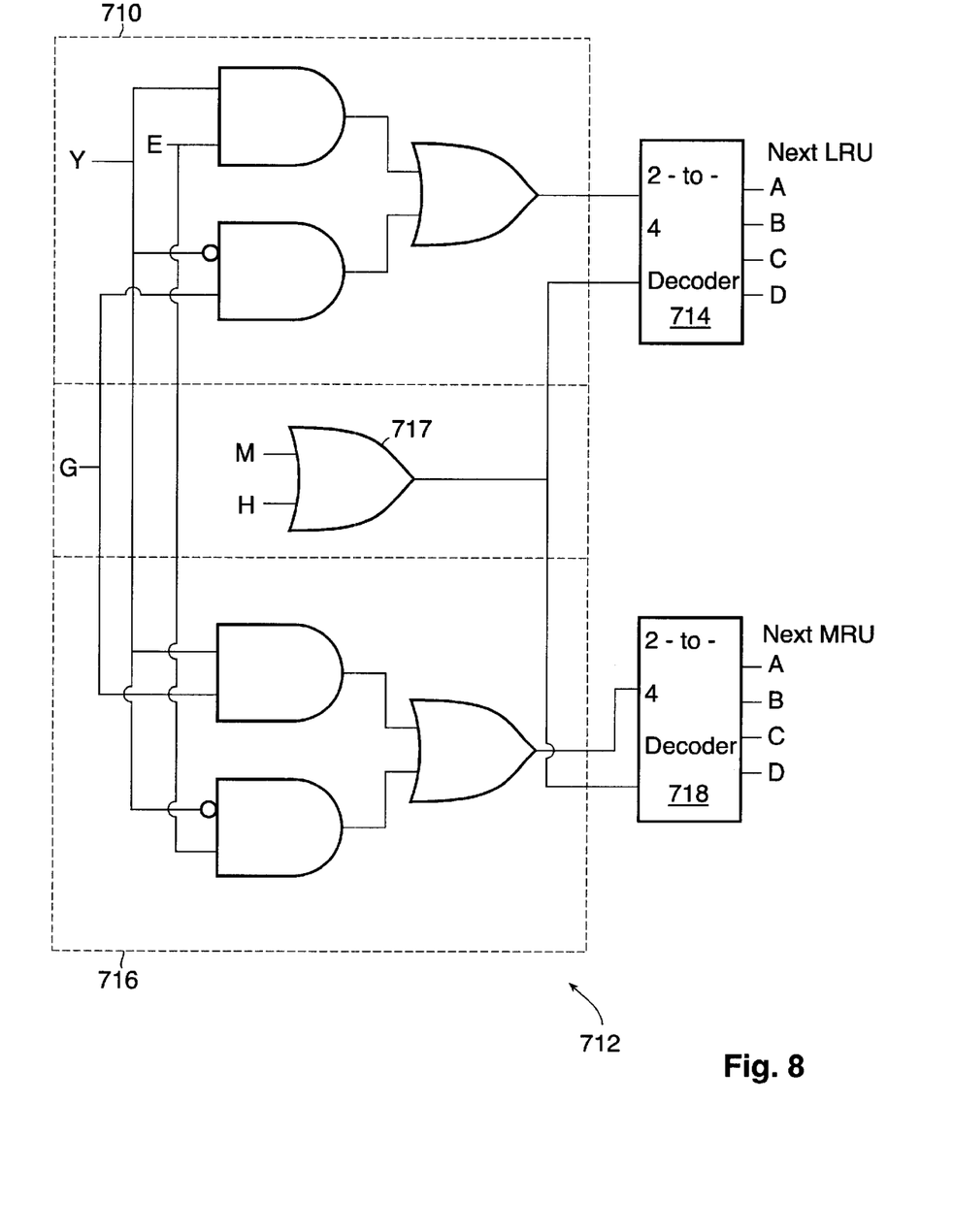

Referring to FIG. 8, step 624 may be performed by logic portion 710, of logic block 712.

In step 626, the NLRU is decoded. Step 626 may be performed using two-to-four decoder 714.

The encoded NMRU is determined in step 628. The encoded NMRU is defined by Boolean Equation (4):

$$(Y \& Fq) | (\overline{Y} \& Fp) \quad (4)$$

Step 628 may be performed by logic portion 716 of logic block 712. Note that gate 717 is illustrated as being common to portions 710 and 716 in that an output of gate 717 provides a portion of the signals represented by Boolean Equation (3) and Boolean Equation (4).

The NMRU is decoded in step 630. The decoding of the NMRU, step 630, may be performed by two-to-four decoder 718, FIG. 7.

In this way, a complete history of a four-way associative cache is encoded using five data bits. First and second bit pairs immediately encode the LRU and MRU, respectively. The remaining single bit encodes the NLRU and NMRU, in conjunction with information contained in the first and second bit pairs. By combining the remaining bit, with intermediate data signals formed from the first and second bit pairs in commenatoric logic, the NMRU and NLRU are decoded.

Although the present invention and its advantages have been described in detail, it should be understood that various changes, substitutions and alterations can be made herein without departing from the spirit and scope of the invention as defined by the appended claims.

What is claimed is:

1. A method of encoding a use history comprising the steps of:
    encoding a least recently used (LRU) set with a first preselected bit pair;
    encoding a most recently used (MRU) set with a second preselected bit pair; and
    encoding a next least recently used (NLRU) set and a next most recently used (NMRU) set with a preselected single bit.

2. The method of claim 1 wherein said single bit has a first predetermined value when said NLRU and said NMRU are in order, and a second predetermined value when said NLRU and said NMRU are out of order.

3. The method of claim 1 further comprising the step of determining a use history by decoding an encoded use history, said decoding comprising the steps of:
    decoding said first bit pair to determine said LRU;
    decoding said second bit pair to determine said MRU; and
    decoding said NLRU and said NMRU in response to said single bit and said first and second bit pairs.

4. The method of claim 3 wherein said decoding of said first bit pair uses a first two-to-four decoder and said decoding of said second bit pair a second two-to-four decoder.

5. The method of claim 3 wherein said step of decoding said NLRU and said NMRU further comprises the steps of:
    forming first, second, third and fourth intermediate signals in response to said first and second bit pairs;
    forming a first logical combination of said first and second intermediate signals and said single bit;
    forming a second logical combination of said first and second intermediate signals and said single bit;
    forming a third logical combination of said third and fourth intermediate signals;
    decoding said first and third logical combinations to form said NLRU; and
    decoding said second and third logical combinations to form said NMRU.

6. The method of claim 5 wherein said first intermediate signal comprises a logical NOR of a first bit of said first and second bit pairs, said second intermediate signal comprises a logical NAND of said first bit of said first and second bit pairs, said third intermediate signal comprises a logical AND of a first and second output of first and second logical OR operations, said first output comprising a logical OR of complements of first and second bits of said first bit pair and a first bit of said second bit pair, and said second output comprising a logical OR of complements of first and second bits of said second bit pair and said first bit of said first bit pair, and wherein said fourth intermediate signal comprises a logical OR of a first and second outputs of corresponding logical AND operations, said first AND output comprising a logical AND of complements of said first bit pair and said first bit of said second bit pair and said second AND output comprising a logical AND of complements of said second bit pair and said first bit of said first bit pair.

7. The method of claim 5 wherein said step of forming said first logical combination comprises the steps of:
    forming first and second outputs of corresponding AND operations, said first output comprising a logical AND of said first intermediate signal and said single bit, and said second output comprising a logical AND of said second intermediate signal and a complement of said single bit; and
    forming a logical OR of said first and second outputs, wherein said step of forming said second logical combination comprises the steps of:
    forming third and fourth outputs of corresponding AND operations, said third output comprising a logical AND of said second intermediate signal and said single bit, and said fourth output comprising a logical AND of said complement of said single bit and said second intermediate signal; and
    forming a logical OR of said third and fourth outputs, and wherein said third logical combination comprises a logical OR of said third and fourth intermediate signals.

8. A data processing system comprising:
    a cache memory including a plurality of cache line sets;
    circuitry operable for generating a cache set use history encoding; and
    circuitry coupled to said cache memory operable for decoding said encoding, wherein said encoding comprises no more than five bits, said encoding being operable for recovering a complete use history, and wherein a least recently used (LRU) cache set is encoded by a first bit pair and a most recently used (MRU) cache set is encoded by a second bit pair;
    wherein said circuitry operable for generating a cache set use history encoding comprises:
    circuitry operable for associating a preselected first bit pair value with said LRU cache set;
    circuitry operable for associating a predetermined second bit pair with said MRU cache set; and
    circuitry operable for associating a single bit with a next least recently used (NLRU) cache set and a next most recently used (NMRU) cache set.

9. The data processing system of claim 8 wherein said single bit has a first predetermined value when said NLRU set and NMRU set have an in-order relationship, and said single bit has a second predetermined value when said NLRU set and NMRU set have an out-of-order relationship.

10. The data processing system of claim 8 wherein said circuitry operable for decoding comprises:
    circuitry operable for forming first, second, third and fourth intermediate signals in response to said first and second bit pairs;
    circuitry operable for forming a first logical combination of said first and second intermediate signals and said single bit;
    circuitry operable for forming a second logical combination of said first and second intermediate signals and said single bit;

circuitry operable for forming a third logical combination of said third and fourth intermediate signals;

circuitry operable for decoding said first and third logical combinations to form said NLRU; and circuitry operable for decoding said second and third logical combinations to form said NMRU.

11. The data processing system of claim 10 wherein said circuitry operable for forming said first logical combination includes a first AND gate having a first input receiving said single bit and a second input receiving said first intermediate signal, a second AND gate having a first input receiving a complement of said single bit and a second input receiving said second intermediate signal and a first OR gate having first and second inputs respectively coupled to outputs of said first and second AND gates, said first OR gate outputting said first logical combination, and wherein said circuitry operable for forming said second logical combination includes a third AND gate having a first input receiving said single bit and a second input receiving said second intermediate signal, a fourth AND gate having a first input receiving a complement of said single bit and a second input receiving said first intermediate signal and a second OR gate having first and second inputs respectively coupled to outputs of said third and fourth AND gates, said second OR gate outputting said second logical combination.

12. The data processing system of claim 10 wherein said circuitry operable for forming said third logical combination comprises an OR gate having first and second inputs receiving said third and fourth intermediate signals, said OR gate outputting said third logical combination.

13. The data processing system of claim 10 wherein said circuitry operable for forming said third intermediate signal comprises:

a first AND gate having a first input receiving a complement of a first bit of said first bit pair, a second input receiving a complement of a second bit of said first bit pair and a third input receiving a first bit of said second bit pair;

a second AND gate having a first input receiving a complement of said second bit of said second bit pair, a second input receiving a second bit of said second bit pair and a third input receiving said first bit of said first bit pair; and an OR gate having two inputs, each coupled to an output of said first and second AND gates, said OR gate outputting said third intermediate signal.

14. The data processing system of claim 10 wherein said circuitry operable for forming said fourth intermediate signal comprises:

a first OR gate having a first input receiving a complement of a first bit of said first bit pair, a second input receiving a complement of a second bit of said first bit pair and a third input receiving a first bit of said second bit pair;

a second OR gate having a first input receiving a complement of said first bit of said second bit pair, a second input receiving a complement of a second bit of said second bit pair and a third input receiving said first bit of said first bit pair; and an AND gate having two inputs, each coupled to an output of said first and second OR gates, said AND gate outputting said fourth intermediate signal.

15. The data processing system of claim 10 wherein said circuitry operable for forming said first intermediate signal comprises a NOR gate having two inputs, each input receiving a first bit of said first and second bit pairs, said NOR gate outputting said first intermediate signal, and wherein said circuitry operable for forming said second intermediate signal comprises a NAND gate having two inputs, each input receiving said first bit of said first and second bit pairs, said NAND gate outputting said second intermediate value.

16. The data processing system of claim 10 wherein said circuitry operable decoding said first and third logical combinations to form said NLRU comprises a first two-to-four decoder, and wherein said circuitry operable for decoding said second and third logical combinations to form said NMRU comprises a second two-to-four decoder.

17. A method of cache set history generation comprising the steps of:

decoding a next least recently used (NLRU) set and a next most recently used set (NMRU) in a previous use history in response to first and second bit pairs and a single bit encoding said previous history;

decoding a most recently used set in said previous history in response to said second bit pair encoding said previous history;

encoding a first bit pair in a current history in response to said previous NLRU;

encoding a second bit pair in said current history in response to a cache hit; and encoding a single bit in said current history in response to said NMRU and said MRU in said previous history.

18. The method of claim 17 wherein said single bit in said current history has a first predetermined value when said NMRU and said MRU in said previous history set have an in-order relationship, and said single bit has a second predetermined when said NMRU and said MRU in said previous history set have an out-of-order relationship.

19. The method of claim 17 wherein said previous use history is stored in a use history array in a cache memory management unit.

20. A data processing system comprising:

a cache memory including a plurality of cache line sets;

circuitry operable for generating a cache set use history encoding; and circuitry coupled to said cache memory operable for decoding said encoding, said decoding circuitry comprising:

circuitry operable for forming first, second, third and fourth intermediate signals in response to first and second bit pairs in said encoding;

circuitry operable for forming a first logical combination of said first and second intermediate signals and a single bit in said encoding;

circuitry operable for forming a second logical combination of said first and second intermediate signals and said single bit;

circuitry operable for forming a third logical combination of said third and fourth intermediate signals;

circuitry operable for decoding said first and third logical combinations to form a first decoded history signal; and circuitry operable for decoding said second and third logical combinations to form a second decoded history signal.

21. The data processing system of claim 20 wherein said circuitry operable for forming said first logical combination includes a first AND gate having a first input receiving said single bit and a second input receiving said first intermediate signal, a second AND gate having a first input receiving a complement of said single bit and a second input receiving said second intermediate signal and a first OR gate having first and second inputs respectively coupled to outputs of said first and second AND gates, said first OR gate outputting said first logical combination, and wherein said circuitry operable for forming said second logical combination includes a third AND gate having a first input receiving said single bit and a second input receiving said second intermediate signal, a fourth AND gate having a first input receiving a complement of said single bit and a second input receiving said first intermediate signal and a second OR gate having first and second inputs respectively coupled to outputs of said third and fourth AND gates, said second OR gate outputting said second logical combination.

22. The data processing system of claim 20 wherein said circuitry operable for forming said third logical combination comprises an OR gate having first and second inputs receiving said third and fourth intermediate signals, said OR gate outputting said third logical combination.

23. The data processing system of claim 20 wherein said circuitry operable for forming said third intermediate signal comprises:
- a first AND gate having a first input receiving a complement of a first bit of said first bit pair, a second input receiving a complement of a second bit of said first bit pair and a third input receiving a first bit of said second bit pair;
- a second AND gate having a first input receiving a complement of said second bit of said second bit pair, a second input receiving a second bit of said second bit pair and a third input receiving said first bit of said first bit pair; and
- an OR gate having two inputs, each coupled to an output of said first and second AND gates, said OR gate outputting said third intermediate signal.

24. The data processing system of claim 20 wherein said circuitry operable for forming said fourth intermediate signal comprises:
- a first OR gate having a first input receiving a complement of a first bit of said first bit pair, a second input receiving a complement of a second bit of said first bit pair and a third input receiving a first bit of said second bit pair;
- a second OR gate having a first input receiving a complement of said first bit of said second bit pair, a second input receiving a complement of a second bit of said second bit pair and a third input receiving said first bit of said first bit pair; and
- an AND gate having two inputs, each coupled to an output of said first and second OR gates, said AND gate outputting said fourth intermediate signal.

25. The data processing system of claim 20 wherein said circuitry operable for forming said first intermediate signal comprises a NOR gate having two inputs, each input receiving a first bit of said first and second bit pairs, said NOR gate outputting said first intermediate signal, and wherein said circuitry operable for forming said second intermediate signal comprises a NAND gate having two inputs, each input receiving said first bit of said first and second bit pairs, said NAND gate outputting said second intermediate value.

26. The data processing system of claim 25 wherein said decoding circuitry further comprises:
- circuitry for decoding said first bit pair to form a third decoded history signal; and
- circuitry for decoding said second bit pair to form a fourth decoded history signal.

27. The data processing system of claim 26 wherein said circuitry for decoding said first and second bit pairs comprises first and second two-to-four decoders.

28. The data processing system of claim 26 wherein said first history signal represents a next most recently used (NMRU) set, said second history signal represents a most recently used (MRU) set, said third history signal represents a least recently used (LRU) set, and said fourth history signal represents a next least recently used (NLRU) set.

29. The data processing system of claim 26 wherein said first history signal represents a next least recently used (NLRU) set, said second history signal represents a next most recently used (NMRU) set, said third history signal represents a least recently used (LRU) set, and said fourth history signal represents a most recently used (MRU) set.

30. The data processing system of claim 26 wherein said first history signal represents a least recently used (LRU) set, said second history signal represents a most recently used (MRU) set, said third history signal represents a next least recently used (NLRU) set, and said fourth history signal represents a next most recently used (NMRU) set.

* * * * *

UNITED STATES PATENT AND TRADEMARK OFFICE
CERTIFICATE OF CORRECTION

PATENT NO. : 6,338,120 B1 Page 1 of 1
DATED : January 8, 2002
INVENTOR(S) : Brian Patrick Hanley

It is certified that error appears in the above-identified patent and that said Letters Patent is hereby corrected as shown below:

Column 3,
Line 1, replace "illustrates" with -- illustrate --.

Column 7,
Line 5, replace "FIG. 7" with -- FIG. 8 --.

Signed and Sealed this

Eleventh Day of June, 2002

Attest:

Attesting Officer

JAMES E. ROGAN
Director of the United States Patent and Trademark Office